Oct. 25, 1927.
B. E. TAYLOR
1,646,714
TRANSFER MECHANISM
Original Filed Jan. 28, 1926    4 Sheets-Sheet 2
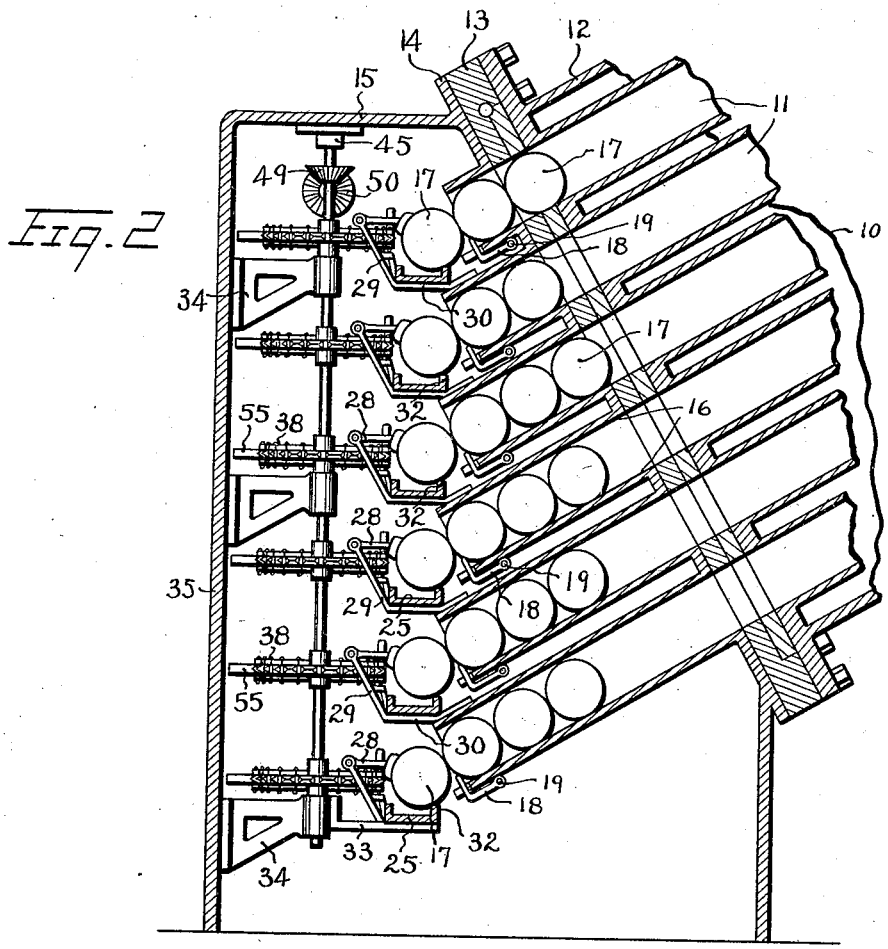
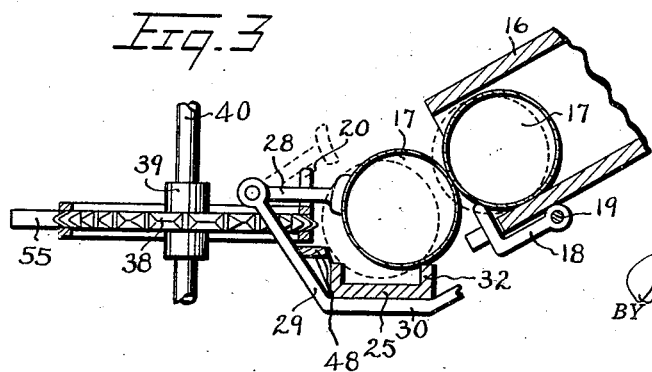
INVENTOR
Burt E. Taylor
BY Archibald Cox
ATTORNEY Oct. 25, 1927.
B. E. TAYLOR
1,646,714
TRANSFER MECHANISM
Original Filed Jan. 28, 1926    4 Sheets-Sheet 3
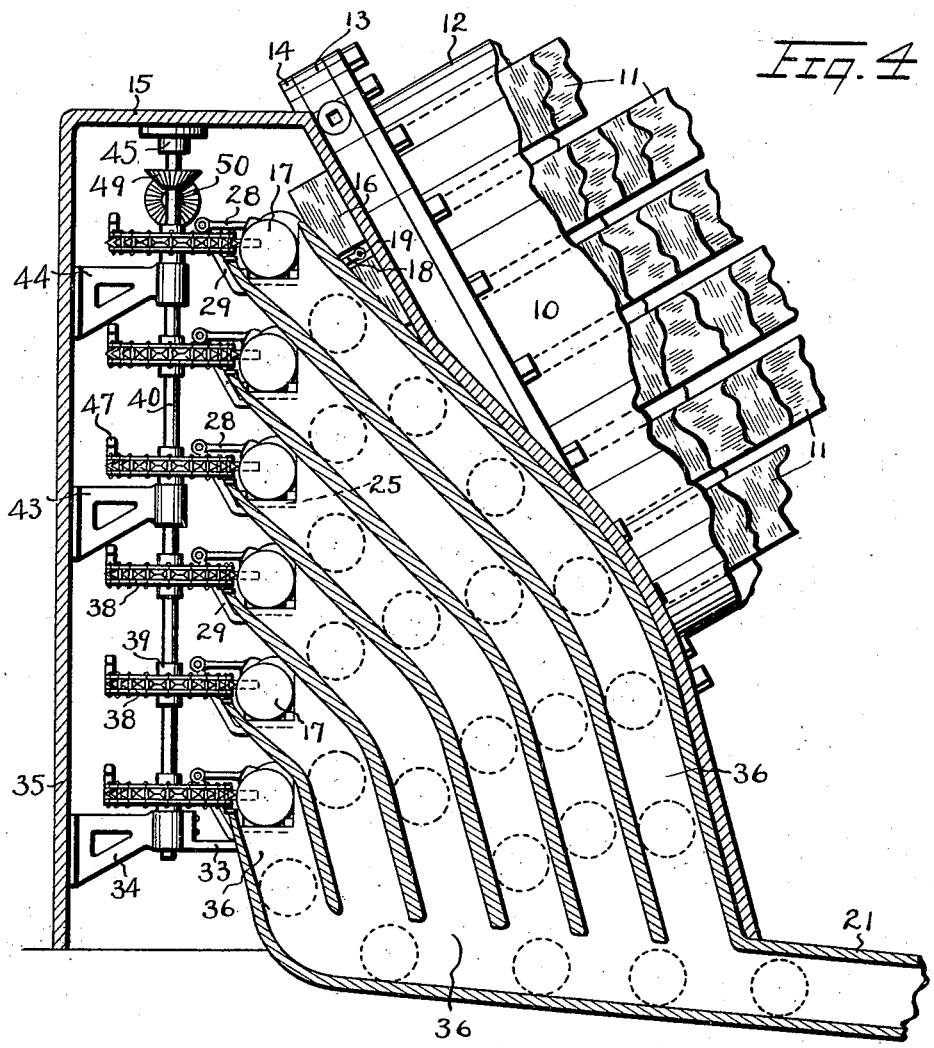

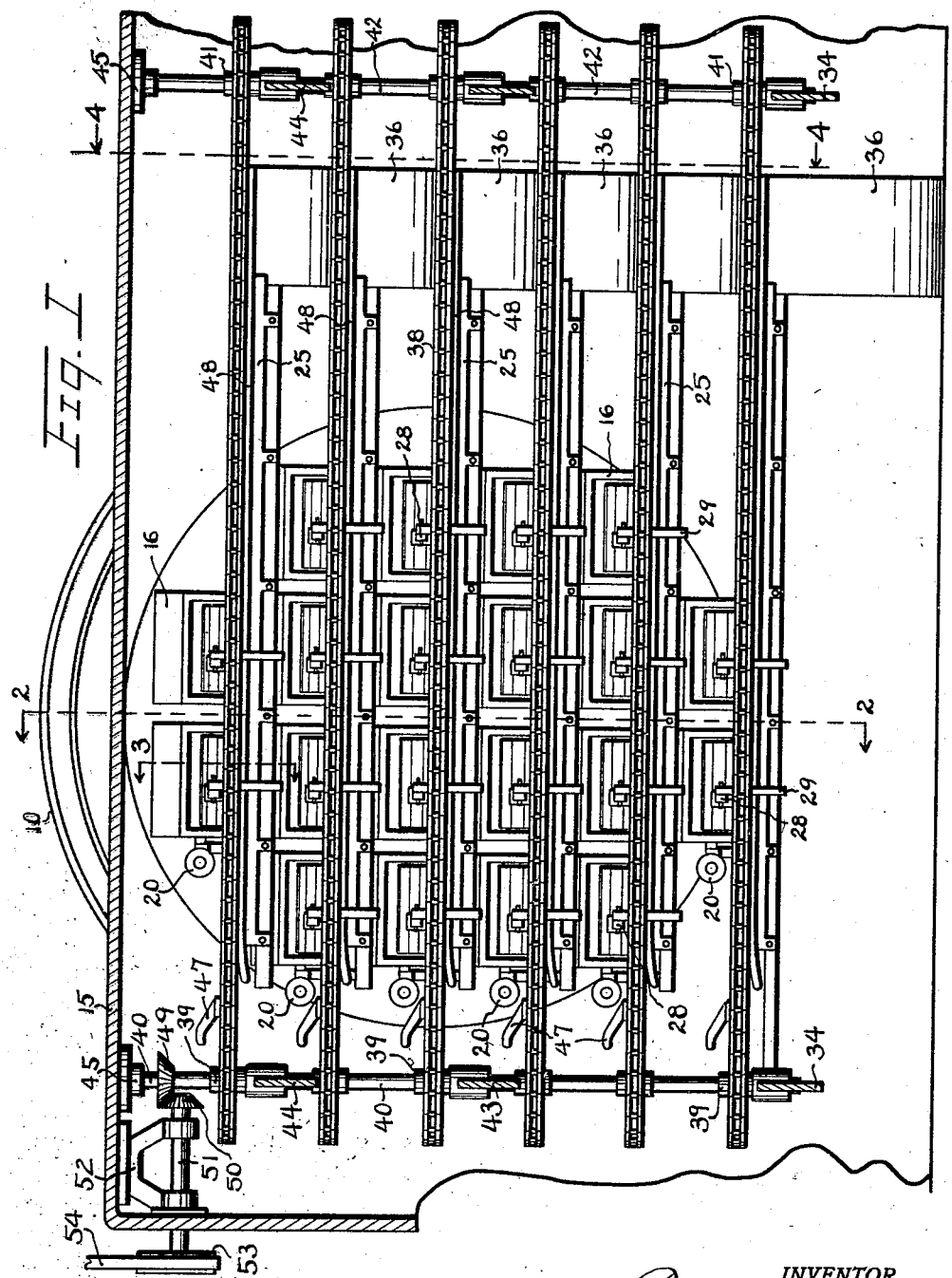

Oct. 25, 1927.
B. E. TAYLOR
1,646,714
TRANSFER MECHANISM
Original Filed Jan. 28, 1926    4 Sheets-Sheet 4
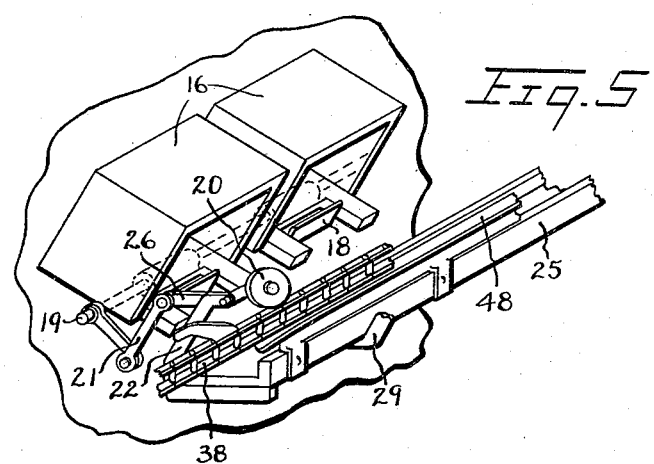
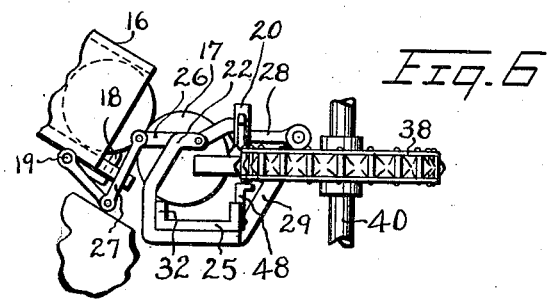
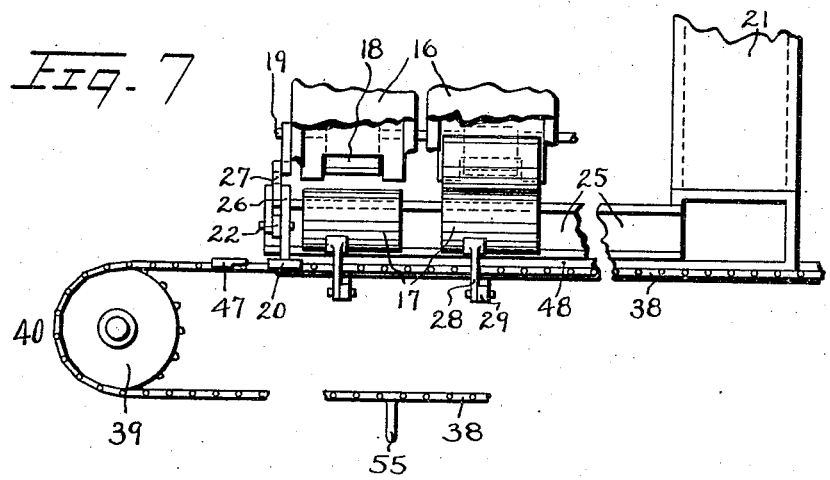
INVENTOR
Burt E. Taylor
BY Archibald Coy
ATTORNEY Patented Oct. 25, 1927.

1,646,714

UNITED STATES PATENT OFFICE.

BURT E. TAYLOR, OF MOUNT VERNON, NEW YORK, ASSIGNOR TO THE BORDEN COMPANY, OF NEW YORK, N. Y., A CORPORATION OF NEW JERSEY.

TRANSFER MECHANISM.

Original application filed January 28, 1926, Serial No. 84,305. Divided and this application filed December 7, 1926. Serial No. 153,108.

The invention relates to an improvement in transfer mechanisms. The present application is a division of my copending application Serial No. 84,305, filed January 28, 1926. This application is directed to the transfer mechanism shown and described but not claimed in my said application.

The object of the invention is to produce an improved and simplified mechanism for receiving articles from a plurality of chutes or tubes and transferring them to a single chute or tube. To this end the invention consists in the improved transfer mechanism hereinafter fully described and particularly pointed out in the appended claims.

In the accompanying drawings illustrating the preferred form of the invention, Fig. 1 is a front elevation of the improved transfer mechanism, with the enclosing casing shown in section or broken away; Fig. 2 is a longitudinal section taken on the line 2—2 of Fig. 1; Fig. 3 is a section on an enlarged scale taken along the line 3—3 of Fig. 1; Fig. 4 is a section taken along the line 4—4 of Fig. 1; Fig. 5 is a perspective view of the ends of two of the chutes through which the cans are fed to the transferring means, and showing the stop control devices; Fig. 6 is a side elevation, looking from the left, of one of the units of the transfer mechanism; and Fig. 7 is a plan, with parts broken away, of one of the units of the transfer mechanism.

The transfer mechanism of the present invention may be used for transferring articles of any description from one point to another. For the sake of simplicity of description it will be assumed that the articles to be transferred are cylindrical tin cans such as are used for containing preserved food products. The cans are fed or supplied to the transfer mechanism by a magazine 10, only the lower end of which is indicated in the drawings. The construction and mode of operation of this magazine is fully described in my said application. For present purposes it is necessary to know only that the magazine 10 comprises a series of obliquely arranged tubes or conduits 11 enclosed in a cylindrical shell 12 provided at its lower end with a flange section 13 adapted to be moved into contact with the correspondingly flanged mouth 14 of the casing 15 of the transfer mechanism so as to discharge the cans into the transfer mechanism. The tubes 11 of the magazines 10 are arranged in a series of tiers, the two outside tiers containing four tubes each and the two inner tiers containing six tubes each. These tubes correspond to and aline with a series of tiers of chutes or tubes 16 at the mouth or entrance of the transfer mechanism. These chutes 16 all terminate at their discharge ends in a substantially vertical plane, and since the chutes are obliquely arranged like the tubes 11, the lowermost chutes are longer than the upper chutes, as is seen in Fig. 2. The length of the uppermost chutes is such that they hold only one can each. The other chutes are proportionately longer and hold a proportionately greater number of cans. The cans 17 to be transferred from the plurality of tubes 11 roll down by gravity to the open lower ends of the tubes 11 and are received in the chutes 16. The improved transfer mechanism operates to transfer the cans into the single chute 21 through which they roll to the point at which they are further acted upon.

As the cans roll down out of the tubes 11 into the chutes 16 they are caught and held at the lower ends of the chutes by means of the stop fingers 18. Each discharge end of the chutes 16 is provided with a stop finger, the forward end of which is turned upwardly as a hook and is adapted to project through a cutaway portion in the bottom of each chute. The stop fingers 18 are fastened on the shafts or rods 19 pivotally supported from the under surface of the bottoms of the chutes 16. The upturned ends of the fingers 18 are normally held raised in their can retaining positions by means of the weights 20 pivotally mounted on the upper end of the arms 22 supported from the troughs or channels 25. Each weight 20 operates a row of fingers 18 and for this purpose is provided with a rearwardly extending arm 26, the outer end of which is pivotally connected to the upper end of a link 27, the lower end of which is pivotally connected with an arm secured to and extending forwardly from the corresponding shaft 19. When the weights 20 are raised, in the manner hereinafter described, the fingers 18 are depressed to release the foremost can in each chute 16.

The cans released by the depression of the stop fingers 18 roll into contact with the stop arms 28 pivotally mounted on the upwardly extending parts 29 of the brackets 30 secured to and extending forwardly from the upper surfaces of the ends of the top walls of the next lower row of chutes 16. Each chute 16 is provided opposite its open end with a stop arm 28, the head of which is in the path of travel of the cans released from the chute. The cans caught by the stop arms 28 are held against the rear walls 32 of the channels 25, which are horizontally arranged and extend transversely across the lower ends of the chutes 16. Each channel is positioned below the open lower end of its corresponding row of chutes. All the channels except the lowermost channel are supported at their middle sections by the brackets 30 from the next lower row of chutes. The lowermost channel is supported at one end by the bracket 33 extending forwardly from the left hand bracket 34 secured to the rear wall 35 of the casing 15 and at its other end on the lowermost of the obliquely arranged chutes 36 the upper ends of which are located at the discharge ends of the channels 25. The right hand ends of the other channels 25 are also connected with and supported on their corresponding chutes 36, as shown in Fig. 1.

The cans are held between the stop arms 28 and the rear walls 32 of the channels 25 to permit the stop fingers 18 to return to normal position, retaining the cans in the chutes 16. When the fingers 18 have been returned to their normal can holding position, the arms 28 are then raised to permit the cans to descend into the channels 25, whence they are removed and pushed into the open upper ends of the chutes 36. The chutes 36, as shown in Fig. 4, all discharge at their lower ends into the common chute 21 which conveys the cans to the point at which they are further acted upon.

The mechanism for releasing the fingers 18 and the arms 28 and for shoving the cans along the channels 25 to push them into the chutes 36 comprises the following instrumentalities:—Opposite the open end of each row of chutes 16 and located a little above the corresponding channel 25 is a chain 38 which travels in a horizontal plane and is supported at one end on a sprocket 39 mounted on the shaft 40 and at the other end on the sprocket 41 mounted on the shaft 42. The shafts 40 and 42 are vertically arranged and journaled in the ends of the brackets 34, 43 and 44, which extend inwardly from the rear wall 35 of the casing. The upper ends of the shafts 40 and 42 are journaled in the bearings 45 secured to the underside of the top of the casing 15. On each chain 38 is a cam 47 which slopes rearwardly with respect to the direction of travel of the chain, which is toward the chutes 36. The section of the chain which is located adjacent to each channel rests on a shelf or ledge 48 supported from the adjacent edge of the channel. The upper part of the shaft 40 is provided with a miter gear 49 which meshes with a miter gear 50 mounted on one end of a shaft 51 journaled in the bifurcated bracket 52 depending from the top of the casing and carrying on its outer end a pulley 53 driven by the belt 54. When the cams 47 pass under the weights 20 which are positioned above the sections of the chains traveling toward the chutes 36, the weights are raised, thereby depressing the fingers 18 and releasing the cans held by them. Immediately the cams 47 become disengaged from the weights 20, the weights return to normal position, raising the fingers 18 in front of the next succeeding cans in the chutes 16. The fingers 18 are free to rise because the cans just released by the depression of the fingers 18 are held by the arms 28 and the rear walls of the channels 25 and so hold back the other cans in the chutes 16.

The farther travel of the cams 47 brings them under the stop arms 28, thereby successively raising the latter and permitting the cans held by them to fall fully into the channels 25. When all the cans have thus been placed longitudinally in the channels, the arms 55 projecting laterally from the chains 38 and positioned substantially equidistant in both directions from the cams 47 engage with the foremost can in each channel and thereby move all the cans in the channels toward the chutes 36. As the cans reach the open upper ends of the chutes 36 they fall therethrough into the chute 21.

The mode of operation of these devices is thus briefly resumed: When the cans are released from the magazine 10 they run into the chutes 16 and the foremost cans are held by the fingers 18. The engagement of the cams 47 with the weights 20 depresses the fingers 18 and releases the foremost cans in the chutes 16, permitting them to fall down into position to be caught by the arms 28 and the rear walls 32 of the channels 25. The space which separates the weights 20 from each first left hand arm 28 gives the weights 20 sufficient time to descend to return the fingers 18 to normal can holding position while the cams 47 are traveling from the weights to the first arms 28. Consequently when the arms 28 are raised, permitting the cans to fall fully into the channels the foremost cans in the chutes 16 are held until the fingers 18 are again depressed. When the cans are in the channels the arms 55 move into contact therewith and push them into the chutes 36.

Having thus described the invention, what I claim as new is:—

1. A mechanism for transferring cans and the like comprising, a series of chutes, a stop at the entrance of each chute for retaining the cans therein, a shaft on which the stops are mounted, a weight for holding the stops in operative position, a channel extending transversely of the open ends of the chutes and located below them, means for lifting the weight to actuate the stops to release the first can in each chute, a series of stop arms for preventing the cans from falling into the channel, means for actuating the stop arms to permit the cans to enter the channel, and means for removing the cans from the channel.

2. A mechanism for transferring cans and the like comprising, a series of obliquely arranged chutes having their discharge ends located on substantially the same plane, a stop located in the open end of each chute to retain the cans therein, means for actuating the stops simultaneously to release the first can in each chute, a channel extending transversely of the open ends of the chutes and located below them, a series of stop arms for catching the cans released from the chutes and preventing them from dropping into the channel, means for lifting the stop arms to permit the cans to fall into the channel, and means for pushing the cans longitudinally out of the channel.

3. A mechanism for transferring cans and the like comprising, a longitudinally extending channel, a series of stop arms located at intervals along the channel to prevent cans fed transversely to the channel from dropping fully into the channel, an endless chain located beside the channel and traveling axially thereof, a cam on the chain arranged to pass under the arms to lift them to permit all the cans one after the other to fully enter the channel, an arm carried by the chain for pushing all the cans out of the channel at one operation, and means for actuating the chain.

4. A mechanism for transferring cans and the like comprising, an elongated channel, a series of obliquely arranged chutes having their discharge ends substantially on the same plane and located above and to one side of the channel, a stop connected with the open end of each chute to retain the cans therein, said stops being connected together to operate simultaneously, a weight for holding the stops in operative position, a chain located beside the channel and extending axially thereof, means for actuating the chain, a cam on the chain for lifting the weight to actuate the stops to release the first can in each chute, a series of arms located opposite the ends of the chutes for catching and holding the cans released from the chutes to permit the stops to move into operative position in front of the cans in the chutes, said arms being arranged to be lifted by the cam to permit the cans to fall into the channel, and means on the chain for pushing the cans longitudinally through the channel to remove them therefrom.

5. A mechanism for transferring cans and the like comprising, a longitudinally extending channel, a series of chutes having their lower open ends arranged substantially on the same plane above and to one side of the channel, stop means for retaining the cans in the chutes, a series of stop arms located on the other side of the channel opposite the ends of the chutes to catch the cans released from the chutes and prevent the second can in each chute from passing beyond the stop means, means for actuating the stop means to release the first can in each chute and for actuating the stop arms to permit the cans held thereby to drop into the channel, and means for pushing the cans longitudinally through the channel to remove them therefrom.

6. A mechanism for transferring cans and the like comprising, a longitudinally extending channel, a series of obliquely arranged tubes having their lower ends arranged substantially on the same plane to one side of and above the channel, a stop finger connected with the open end of each tube to retain the cans therein, a shaft on which the stop fingers are mounted, a weight connected with the shaft for holding the stop fingers in operative position, a series of stop arms located on the other side of the channel and opposite the tubes to prevent the cans released from the tubes from passing into the channel, an endless chain located beside the channel and extending axially thereof, a cam on the chain arranged to engage and lift the weight to actuate the stop fingers to release the cans held thereby, said cam also passing under the stop arms to lift them to permit the cans held thereby to fall into the channel, an arm connected with the chain for pushing the cans longitudinally through the channel to remove them therefrom, a chute under the discharge end of the channel to receive the cans, and means for actuating the chain.

7. A mechanism for transferring cans and the like comprising, a series of obliquely arranged chutes down which the cans are adapted to roll, said chutes having their lower discharge ends arranged on substantially the same plane, a channel arranged transversely of the lower ends of the chutes in position to receive the cans therefrom, means for delivering the lowermost can in each chute into the channel, a single delivery chute, and means for removing all the cans from the channel at one operation and discharging them into the delivery chute.

BURT E. TAYLOR.